US012762288B2

(12) United States Patent
Zhang et al.

(10) Patent No.: US 12,762,288 B2
(45) Date of Patent: Oct. 13, 2026

(54) SOFTWARE VERSION-AWARE ENCRYPTION KEY FOR SECURE MUTABLE PARTITIONS

(71) Applicant: Skydio, Inc., San Mateo, CA (US)

(72) Inventors: Jerry Xiri Zhang, Menlo Park, CA (US); Brian David Kubisiak, San Mateo, CA (US); Alex Mallery, Palo Alto, CA (US)

(73) Assignee: Skydio, Inc., San Mateo, CA (US)

( * ) Notice: Subject to any disclaimer, the term of this patent is extended or adjusted under 35 U.S.C. 154(b) by 31 days.

(21) Appl. No.: 19/067,028

(22) Filed: Feb. 28, 2025

(65) Prior Publication Data

US 2025/0278521 A1 Sep. 4, 2025

Related U.S. Application Data

(60) Provisional application No. 63/560,458, filed on Mar. 1, 2024.

(51) Int. Cl.
*G06F 21/64* (2013.01)
*G06F 21/60* (2013.01)
*G06F 21/62* (2013.01)

(52) U.S. Cl.
CPC ............ *G06F 21/64* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 9,635,021 B2 * | 4/2017 | Smith | .................. | H04L 9/3226 |
| 2012/0324446 A1 * | 12/2012 | Fries | ..................... | H04L 9/3236 718/1 |
| 2024/0248742 A1 * | 7/2024 | Frosi | ....................... | G06F 9/455 |

FOREIGN PATENT DOCUMENTS

| | | | | |
|---|---|---|---|---|
| FR | 3032846 A1 * | 8/2016 | ......... | H04L 63/0869 |

* cited by examiner

*Primary Examiner* — Benjamin E Lanier
(74) *Attorney, Agent, or Firm* — Young Basile Hanlon & MacFarlane, P.C.

(57) ABSTRACT

Described herein are systems for software version-aware encryption key for secure mutable partitions. For example, some methods include verifying a digital signature of a header for an application image, wherein the header includes a hash of the application image; generating an encryption key based on the hash; encrypting, using the encryption key, data to be written to a writable partition that is mounted with a filesystem of the application image; and decrypting, using the encryption key, data read from the writable partition.

20 Claims, 11 Drawing Sheets

SOFTWARE VERSION-AWARE ENCRYPTION KEY FOR SECURE MUTABLE PARTITIONS

CROSS REFERENCE TO RELATED APPLICATIONS

This application claims the benefit of U.S. Provisional Application No. 63/560,458, filed Mar. 1, 2024, the contents of which are incorporated by reference herein in their entirety.

TECHNICAL FIELD

This disclosure relates to software version-aware encryption key for secure mutable partitions.

BACKGROUND

Unmanned aerial vehicles (e.g., a drone) can be used to capture images from vantage points that would otherwise be difficult to reach. The unmanned aerial vehicles typically are operated by a human using a specialized controller to remotely control the movements and image capture functions of the unmanned aerial vehicle. Some automated image capture modes have been implemented in unmanned aerial vehicles, such as recording video while following a recognized user or a user carrying a beacon device as the user moves through an environment. Unmanned aerial vehicles may be used to capture and store sensitive data. Data security on an unmanned aerial vehicles may be a significant concern.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
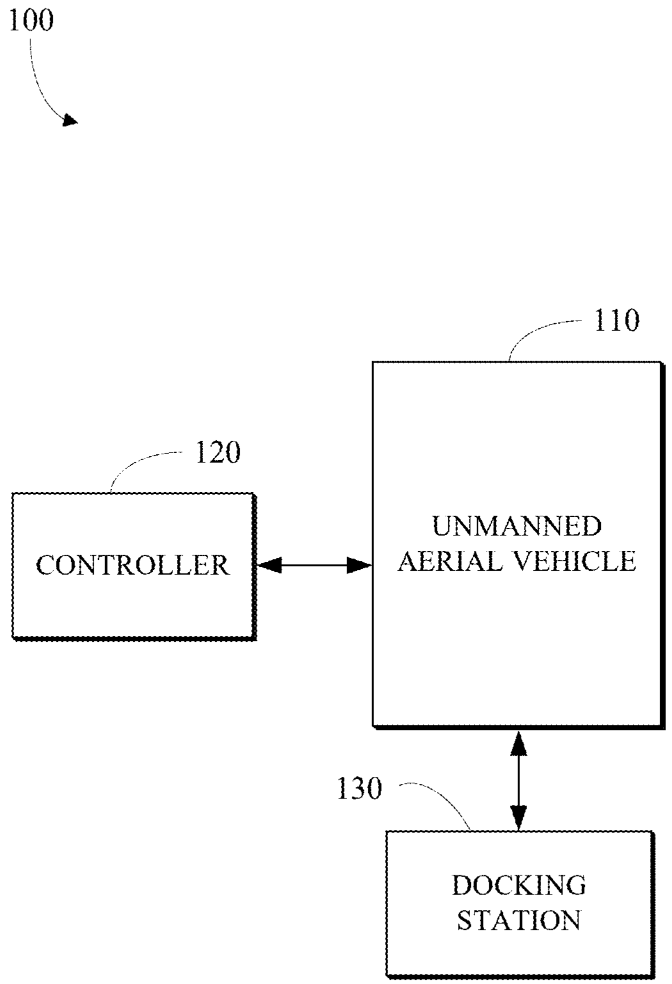
FIG. 1 is an illustration of an example of a system for using a software version-aware encryption key for secure mutable partitions.

Tamper resistant software forms the basis of platform security in modern embedded systems. Usually, this is achieved with a secure bootchain where each boot stage checks the signature of the next boot stage before executing it. This may be dependent, however, on each software image being identical fleet-wide in order to have consistent signatures, as well as the images being read-only on disk to maintain the validity of the signature.

An entire read-only filesystem is often not practical for high-level operating systems (e.g., Linux), since applications and software packages may rely on being able to write to certain paths on disk. There may be concern regarding writable portions that are used as a cache, possibly to speed up software loading but relatively easily recoverable if lost. A workaround for this is to separate out the read-only portion of the software into its own partition which can be signature checked and a writable "cache" portion which doesn't have a consistent signature. The writable portion can then be integrated into the filesystem structure by mounting it over the read-only portion, either directly or using overlay mounts.

Although this side-by-side read-only/writable partition strategy works, it somewhat reduces the security of the original signature checking. There will now be a certain portion of the filesystem that is not checked for integrity, and it could be used as a channel for attackers to modify binaries or configuration files in order to affect system behavior in an unwanted way.

Further securing the writable partition(s) by encrypting them with a secure device-specific secret key may help mitigate the above threats by preventing offline attacks. The encryption key may only be known by device software, so an attacker would not be able to modify system storage in a way that produces anything but jumbled data (with the possible exception of some limited bit-flipping attacks).

The remaining threat then for the writable "cache" partition is the case where device software has already been exploited via some other vulnerability and attacker software is running directly on the device. In this case, an attacker would have the ability to directly write encrypted data. Although it's impractical to prevent all exploits, it would be desirable to be able to patch future software versions to remove the vulnerability. Even with the original vulnerability patched though, new software may still be vulnerable to malicious data written to disk as it is unable to distinguish data written by older software versions with data written by itself.

According to implementations of this disclosure, vulnerabilities such as those described above may be removed by deriving a new encryption key from the device secret key and a unique but random string identifying the software version. This is then used as the encryption key for the writable partition. This approach may have some of the following properties: the key derivation generally may be performed in a trusted execution context with a much smaller attack surface; an attacker will not be able to predict keys for future software versions even if they can somehow guess the software version string, which may itself be random; changing the software version may automatically change the encryption key, causing all existing data to be unreadable; on the first bootup in this state, the device will generally recognize a corrupt filesystem and reformat the partition.

An attacker would thus need to discover a vulnerability in the trusted execution context or break significant cryptography in order to persist any data in the cache partition between software versions, allowing future software to be run without the risk of malicious data stored from older software. This serves to limit a significant amount of the practical risk of running with a non-verified mutable overlay, and makes the device software more secure.

In unmanned aerial vehicle fleet management, secure firmware updates may be critical to prevent unauthorized mission data tampering. Encryption frameworks disclosed herein may serve to ensure that a compromised unmanned aerial vehicle cannot retain persistent malicious modifications across software updates. By utilizing a software version-aware encryption key, a system may cause new firmware versions to automatically invalidate outdated cached mission parameters, preventing an attacker from rolling back system behavior to a previously compromised state. Furthermore, the encryption key may be derived dynamically using both device-specific fuses and software version hashes, ensuring that even cloned unmanned aerial vehicles cannot decrypt or manipulate another unmanned aerial vehicle's stored mission data.

Unlike conventional secure boot methodologies that validate only executable binaries, some systems disclosed herein may enforce a continuous security mechanism by dynamically invalidating stored data upon a software update. Such systems may prevent unauthorized persistence of modified configuration files, telemetry logs, or cached mission data that could be used to manipulate unmanned aerial vehicle behavior. The integration of version-aware encryption within an unmanned aerial vehicle may address domain-specific constraints, such as real-time data processing, power efficiency considerations, and remote firmware management across unmanned aerial vehicle fleets. These unmanned aerial vehicle-specific security challenges are not addressed by conventional secure boot implementations.

Data security is an important consideration for many computing devices, including unmanned aerial vehicles that may be used to collect and store sensitive data. Disclosed herein are techniques for using a software version-aware encryption key for secure mutable partitions. Some implementations may provide advantages over earlier systems, such as: enabling secure patching of software for individual unmanned aerial vehicles or across a fleet of unmanned aerial vehicles; and improved data security in an unmanned aerial vehicle or another computing device.

Software running on a processing apparatus in an unmanned aerial vehicle and/or on a controller for the unmanned aerial vehicle may be used to implement the software version-aware encryption key techniques described herein.

FIG. 1 is an illustration of an example of a system 100 configured for using software version-aware encryption keys for secure mutable partitions. The system 100 includes an unmanned aerial vehicle 110, a controller 120, and a docking station 130. The controller 120 may communicate with the unmanned aerial vehicle 110 via a wireless communications link (e.g., via a WiFi network or a Bluetooth link) to receive video or images and to issue commands (e.g., take off, land, follow, manual controls, and/or commands related to conducting an autonomous or semi-autonomous scan of a roof). For example, the controller 120 may be the controller 250 of FIG. 2C. In some implementations, the controller includes a smartphone, a tablet, or a laptop running software configured to communicate with and control the unmanned aerial vehicle 110. For example, the system 100 may be used to implement the process 600 of FIG. 6. For example, the system 100 may be used to implement the process 700 of FIG. 7. For example, the system 100 may be used to implement the process 800 of FIG. 8.

The unmanned aerial vehicle 110 includes a propulsion mechanism (e.g., including propellers and motors), one or more image sensors, and a processing apparatus. For example, the unmanned aerial vehicle 110 may be the unmanned aerial vehicle 200 of FIGS. 2A-B. For example, the unmanned aerial vehicle 110 may include the hardware configuration 400 of FIG. 4. The processing apparatus (e.g., the processing apparatus 410) may be configured to: verify a digital signature of a header for an application image, wherein the header includes a hash of the application image; generate an encryption key based on the hash; encrypt, using the encryption key, data to be written to a writable partition that is mounted with a filesystem of the application image; and decrypt, using the encryption key, data read from the writable partition. In some implementations, the header includes a version string for the application image and the encryption key is generated based on the version string for the application image. For example, the processing apparatus may be configured to: input a context string that includes the hash to a trusted operating system device that is configured to apply a key generation algorithm to determine the encryption key based on the context string and a fuse key of the trusted operating system device. In some implementations, the context string includes at least one of an overlay name, a slot number, and/or a lock state for the writable partition. For example, the hash may be a root hash of a hash tree. For example, the writable partition may be an overlay mount of the filesystem of the application image. In some implementations, the processing apparatus is configured to: detect corruption of the writable partition; and reformat the writable partition responsive to the detection of corruption.

The unmanned aerial vehicle 110 may output image data and/or other sensor data captured during execution of a scan plan to the controller 120 for viewing by a user, storage, and/or further offline analysis. The output from the unmanned aerial vehicle 110 may also include an indication of the coverage of the roof that was achieved by execution of the scan plan. For example, the processing apparatus may be configured to: generate a coverage map of the one or more facets indicating which of the one or more facets have been successfully imaged during execution of the scan plan; and present the coverage map (e.g. via transmission of data encoding the coverage map to the controller 120). It may be important to secure the data when it is stored in the controller 120 as well as in the unmanned aerial vehicle 110. The techniques for using software version-aware encryption keys for secure mutable partitions may also be applied by a processing apparatus of the controller 120. For example, the controller 120 may include a processing apparatus configured to: verify a digital signature of a header for an application image, wherein the header includes a hash of the application image; generate an encryption key based on the hash; encrypt, using the encryption key, data to be written to a writable partition that is mounted with a filesystem of the application image; and decrypt, using the encryption key, data read from the writable partition. In some implementations, the header includes a version string for the application image and the encryption key is generated based on the version string for the application image. For example, the processing apparatus may be configured to: input a context string that includes the hash to a trusted operating system device that is configured to apply a key generation algorithm to determine the encryption key based on the context string and a fuse key of the trusted operating system device. In some implementations, the context string includes at least one of an overlay name, a slot number, and/or a lock state for the writable partition. For example, the hash may be a root hash of a hash tree. For example, the writable partition may be an overlay mount of the filesystem of the application image. In some implementations, the processing apparatus is configured to: detect corruption of the writable partition; and reformat the writable partition responsive to the detection of corruption.

Some targets may be too large to complete execution of the scan plan on a single charge of the battery of the unmanned aerial vehicle 110. It may be useful to pause execution of a scan plan while the unmanned aerial vehicle 110 lands and recharges, before continuing execution of the scan plan where it paused. For example, the docking station 130 may facilitate safe landing and charging of the unmanned aerial vehicle 110 while the execution of the scan plan is paused. In some implementations, the processing apparatus is configured to: after starting and before completing the scan plan, store a scan plan state indicating a next pose of the sequence of poses of the scan plan; after storing the scan plan state, control the propulsion mechanism to cause the unmanned aerial vehicle to fly to land; after landing, control the propulsion mechanism to cause the unmanned aerial vehicle to fly to take off; access the scan plan state; and based on the scan plan state, control the propulsion mechanism to cause the unmanned aerial vehicle to fly to assume the next pose and continue execution of the scan plan. For example, the scan plan state may include a copy of the scan plan and an indication of the next pose, such as a pointer to the next pose in the sequence of poses of the scan plan. In some implementations, the docking station is configured to enable automated landing charging and take-off of the unmanned aerial vehicle 110. For example, the docking station 130 may be the dock 300 of FIG. 3. The techniques for using software version-aware encryption keys for secure mutable partitions may also be applied by a processing apparatus of the docking station 130.

Figure 2A:
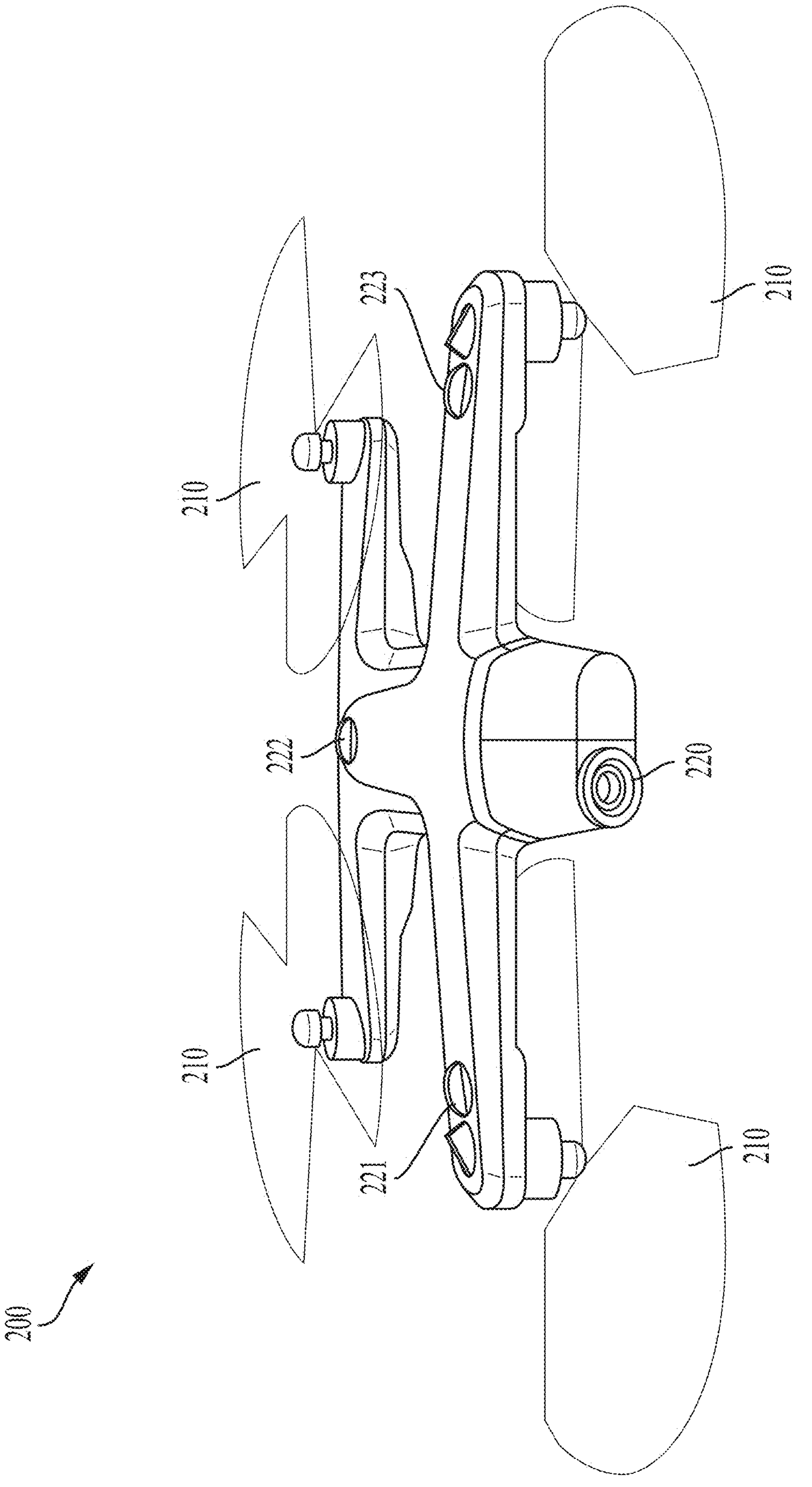
FIG. 2A is an illustration of an example of an unmanned aerial vehicle configured for using a software version-aware encryption key for secure mutable partitions.

FIG. 2A is an illustration of an example of an unmanned aerial vehicle 200 configured for using software version-aware encryption keys for secure mutable partitions as seen from above. The unmanned aerial vehicle 200 includes a propulsion mechanism 210 including four propellers and motors configured to spin the propellers. For example, the unmanned aerial vehicle 200 may be a quad-copter drone. The unmanned aerial vehicle 200 includes image sensors, including a high-resolution image sensor 220 that mounted on a gimbal to support steady, low-blur image capture and object tracking. For example, the image sensor 220 may be used for high resolution scanning of surfaces of a roof during execution of a scan plan. The unmanned aerial vehicle 200 also includes lower resolution image sensors 221, 222, and 223 that are spaced out around the top of the unmanned aerial vehicle 200 and covered by respective fisheye lenses to provide a wide field of view and support stereoscopic computer vision. The unmanned aerial vehicle 200 also includes an internal processing apparatus (not shown in FIG. 2A). For example, the unmanned aerial vehicle 200 may include the hardware configuration 400 of FIG. 4. In some implementations, the processing apparatus is configured to automatically fold the propellers when entering a docking station (e.g., the dock 300 of FIG. 3), which may allow the dock to have a smaller footprint than the area swept out by the propellers of the propulsion mechanism 210.

Figure 2B:
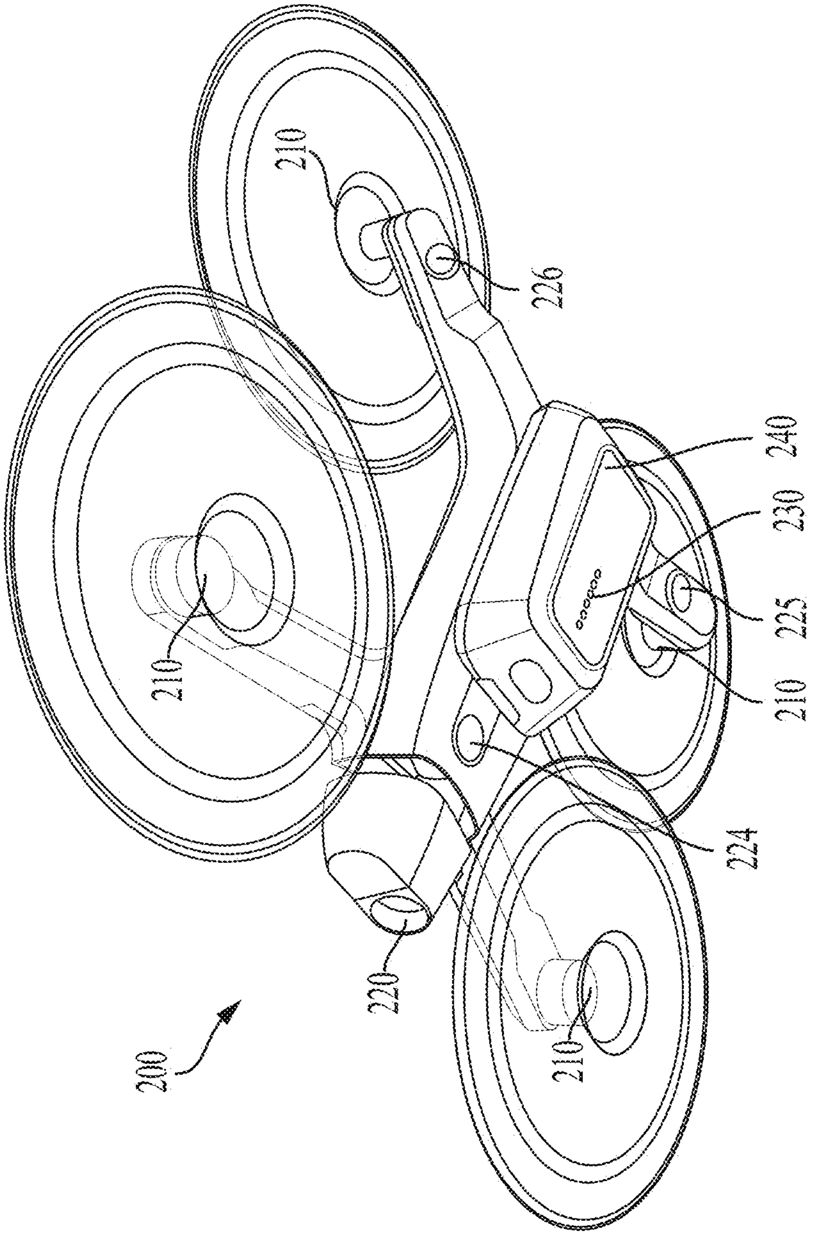
FIG. 2B is an illustration of an example of an unmanned aerial vehicle configured for using a software version-aware encryption key for secure mutable partitions as seen from below.

FIG. 2B is an illustration of an example of an unmanned aerial vehicle 200 configured for using software version-aware encryption keys for secure mutable partitions as seen from below. From this perspective three more image sensors arranged on the bottom of the unmanned aerial vehicle 200 may be seen: the image sensor 224, the image sensor 225, and the image sensor 226. These image sensors (224-226) may also be covered by respective fisheye lenses to provide a wide field of view and support stereoscopic computer vision. This array of image sensors (220-226) may enable visual inertial odometry (VIO) for high resolution localization and obstacle detection and avoidance. For example, the array of image sensors (220-226) may be used to scan a roof to obtain range data and generate a three-dimensional map of the roof.

The unmanned aerial vehicle 200 may be configured for autonomous landing on a landing surface 310. The unmanned aerial vehicle 200 also includes a battery in battery pack 240 attached on the bottom of the unmanned aerial vehicle 200, with conducting contacts 230 to enable battery charging. For example, the techniques described in relation to FIG. 3 may be used to land an unmanned aerial vehicle 200 on the landing surface 310 of the dock 300.

The bottom surface of the battery pack 240 is a bottom surface of the unmanned aerial vehicle 200. The battery pack 240 is shaped to fit on the landing surface 310 at the bottom of the funnel shape. As the unmanned aerial vehicle 200 makes its final approach to the landing surface 310, the bottom of the battery pack 240 will contact the landing surface 310 and be mechanically guided by the tapered sides of the funnel to a centered location at the bottom of the funnel. When the landing is complete, the conducting contacts of the battery pack 240 may come into contact with the conducting contacts 330 on the landing surface 310, making electrical connections to enable charging of the battery of the unmanned aerial vehicle 200. The dock 300 may include a charger configured to charge the battery while the unmanned aerial vehicle 200 is on the landing surface 310.

Figure 2C:
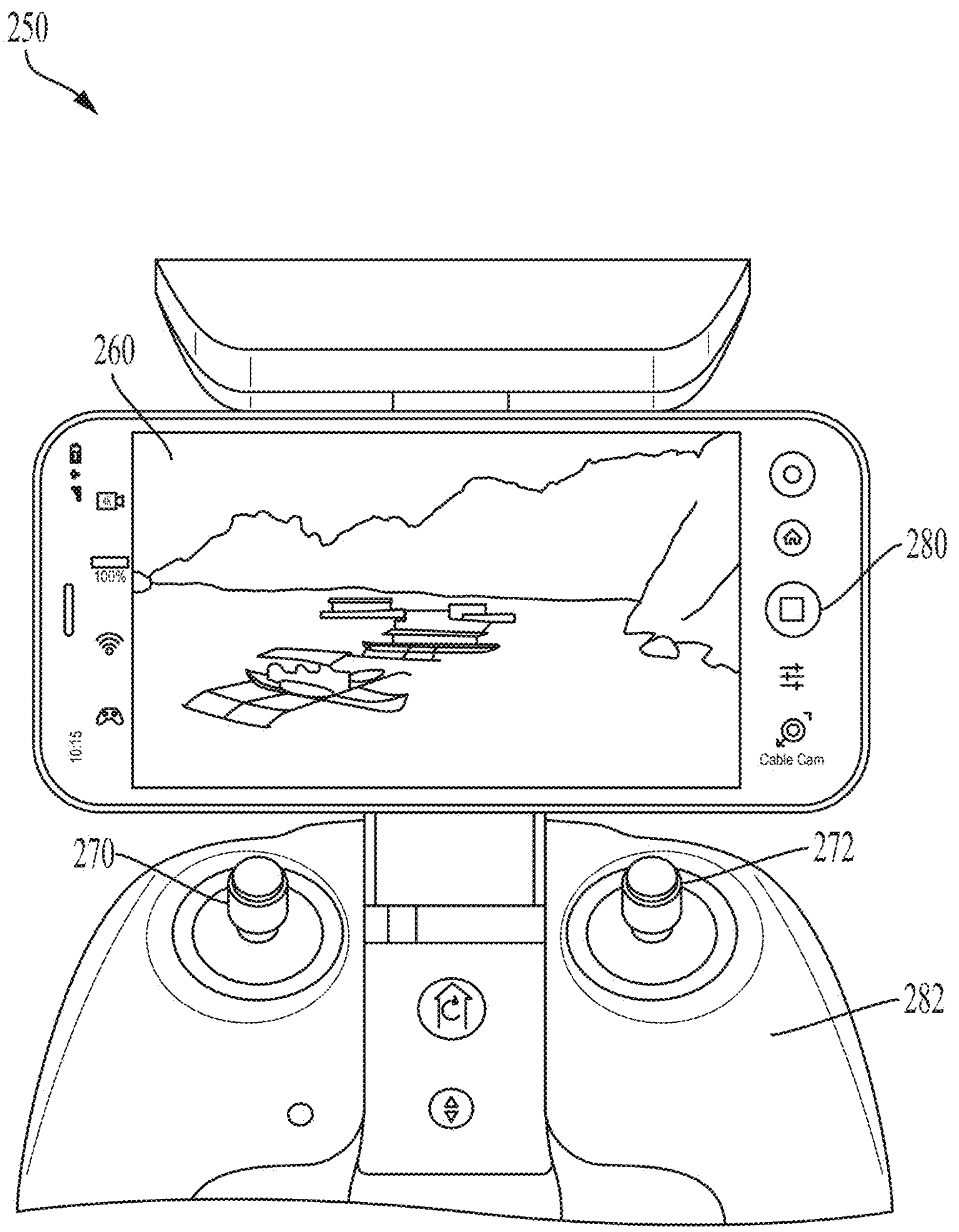
FIG. 2C is an illustration of an example of a controller for an unmanned aerial vehicle.

FIG. 2C is an illustration of an example of a controller 250 for an unmanned aerial vehicle. The controller 250 may provide a user interface for controlling the unmanned aerial vehicle and reviewing data (e.g., images) received from the unmanned aerial vehicle. The controller 250 includes a touchscreen 260; a left joystick 270; and a right joystick 272. In this example, the touchscreen 260 is part of a smartphone 280 that connects to controller attachment 282, which, in addition to providing addition control surfaces including the left joystick 270 and the right joystick 272, may provide range extending communication capabilities for longer distance communication with the unmanned aerial vehicle.

In some implementations, processing (e.g., image processing and control functions) may be performed by an application running on a processor of a remote controller device (e.g., the controller 250 or a smartphone) for an unmanned aerial vehicle being controlled using the remote controller device. Such a remote controller device may provide the interactive features, where the app provides all the functionalities using the video content provided by the unmanned aerial vehicle. For example, a processor of a remote controller device (e.g., the controller 250 or a smartphone) that is in communication with an unmanned aerial vehicle may be used to control the unmanned aerial vehicle.

Much of the value and challenges of autonomous unmanned aerial vehicles lies in enabling robust, fully autonomous missions. Disclosed herein is a dock platform that enables unmanned charging, takeoff, landing, and mission planning of an unmanned aerial vehicle (UAV). Some implementations enable the reliable operation of such a platform and the relevant application programming interface designs that make the system accessible by a wide variety of consumer and commercial applications.

One of the largest limiting factors for operating a drone is the battery. A typical drone can operate for 20-30 minutes before needing a fresh battery pack. This sets a limit on how long an autonomous drone can operate without human intervention. Once a battery pack is drained, an operator has to land the drone and swap the pack for a fully charged one. While battery technology keeps improving and achieving higher energy densities, the improvements are incremental and may not paint a clear roadmap for sustained autonomous operation. An approach to alleviating the need for regular human intervention is to automate the battery management operation with some sort of automated base station.

Some methods disclosed herein leverage visual tracking and control software to be able to perform pin-point landings onto a much smaller target. By using visual fiducials to aid absolute position tracking relative to the base station, the UAV (e.g., a drone) may be able to reliably hit a 5 cm×5 cm target in a variety of environmental conditions. This means that the UAV can be very accurately positioned with the help of a small, passive funnel geometry that helps guide the UAV's battery, which extends below the rest of the UAV's structure, onto a set of charging contacts without the need for any complex actuation or large structure. This may enable a basic implementation of a base station to simply consist of a funnel shaped nest with a set of spring contacts and a visual tag within. To reduce the turbulent ground effect that a UAV typically encounters during landing, this nest can be elevated above the ground, and the profile of the nest itself can be made small enough to stay centered between the UAV's prop wash during landing. Prop wash, or propeller wash, is the disturbed mass of air pushed by a propeller of an aircraft. To allow reliable operation in GPS denied environments, a fiducial (e.g., a small visual tag) within the nest can be supplemented with a larger fiducial (e.g., a large visual tag) located somewhere outside the landing nest, such as on a flexible mat that can be rolled out on the ground near the base station, or attached to a wall nearby. The supplemental visual tag can be easily spotted by the UAV from a significant distance away in order to allow the UAV to reacquire its absolute position relative to the landing nest in a GPS denied environments regardless of any visual inertial odometry (VIO) navigational drift that may have built up over the course of the UAV's mission. Finally, in order for a UAV to be able to cover a large area, a reliable communications link with the UAV may be maintained. Since in most cases an ideal land-and-recharge location is not a good place to locate a transmitter, the communication circuitry may be placed in a separate range-extender module that can be ideally placed somewhere up high and central to the desired mission space for maximum coverage.

The simplicity and low cost of such a system makes up for the amount of time that the UAV is unavailable while its battery is recharged, when compared to a more complex and expensive battery swapping system. Intermittent operation is sufficient for a lot of use cases, and users that need more UAV coverage can simply increase UAV availability by adding another UAV and base station system. This approach of cheaper but more may be cost competitive with a large and expensive battery swapping system, and may also greatly increase system reliability by eliminating the ability of a single point of failure to take down the whole system.

For use cases where a UAV (e.g., a drone) needs to be sheltered from the elements but an existing structure with UAV access is not available, the UAV nest can be incorporated into a small custom shed. This shed may consist of roofed section that the UAV would land beneath attached to a roofless vestibule area that would act as a wind shelter and let the UAV enter and perform a precision landing even in high winds. One useful feature of such a shelter would be an open or vented section along the entire perimeter at the bottom of the walls that would let the drone's downdraft leave the structure instead of turbulently circulating within and negatively impacting stable flight.

For use cases where a UAV (e.g., a drone) needs to be secured more robustly from dust, cold, theft, etc., a mechanized "drone in a box" enclosure may be used. For example, a drawer like box that is just slightly larger than the UAV itself may be used as a dock for the UAV. In some implementations, a motorized door on the side of the box can open 180 degrees to stay out of the downdraft of the UAV. For example, within the box, the charging nest may be mounted onto a telescoping linear slide that holds the UAV well clear of the box when the UAV is taking off or landing. In some implementations, once the UAV lands, the slide would pull the UAV back into the box while the UAV slowly spins the props backwards to fold them into the small space and move them out of the way of the door. This allows the box's footprint to be smaller than the area that the UAV sweeps out with its propellers. In some implementations, a two bar linkage connecting the door to its motor is designed to rotate past center in such a way that once closed, one cannot back-drive the motor by pulling on the door from the outside, effectively locking the door. For example, the UAV may be physically secured within the nest by a linkage mechanism that would leverage the final centimeters of the slide's motion to press the UAV firmly into the nest with a soft roller. Once secured, the box can be safely transported or even inverted without dislodging the UAV.

This actuated enclosure design may be shelf mounted or free standing on an elevated base that would ensure that the UAV is high enough above the ground to avoid ground effect during landing. The square profile of the box makes it simple to stack multiple boxes on top of each other for a multi-drone hive configuration, where each box is rotated 90° to the box below it so that multiple drones can take off and land at the same time without interfering with each other. Because the UAV is physically secured within the enclosure when the box is closed, the box can be mounted to a car or truck and avoid experiencing charging disruptions while the vehicle is moving. For example, in implementations where the UAV deploys sideways out of the box, the box can be flush mounted into a wall to ensure that is entirely out of the way when not landing or taking off.

When closed, the box can be made to have a very high ingress protection (IP) rating, and can be equipped with a rudimentary cooling and heating system to make the system function in many outdoor environments. For example, a high-efficiency particulate absorbing (HEPA) filter over an intake cooling fan may be used to protect the inside of the enclosure from dust in the environment. A heater built into the top of the box can melt away snow accumulation in wintery locations.

For example, the top and sides of the box can be made out of material that do not block radio frequencies, so that a version of the communications range extender can be incorporated within the box itself for mobile applications. In this manner, a UAV (e.g., a drone) can maintain GPS lock while charging and be able to deploy at a moment's notice. In some implementations, a window may be incorporated into the door, or the door and the side panels of the box can be made transparent so that the UAV can see its surroundings before it deploys, and so that the UAV can act as its own security camera to deter theft or vandalism.

In some implementations, spring loaded micro-fiber wipers can be located inside the box in such a way that the navigational camera lenses are wiped clean whenever the drone slides into or out of the box. In some implementations, a small diaphragm pump inside the box can charge up a small pressure vessel that can then be used to clean all of the drone's lenses by blowing air at them through small nozzles within the box.

For example, the box can be mounted onto a car by way of three linear actuators concealed within a mounting base that would be able to lift and tilt the box at the time of launch or landing to compensate for the vehicle standing on a hilly street or uneven terrain.

In some implementations, the box can include a single or double door on the top of the box that once it slides or swings open allows the landing nest to extend up into the open air instead of out to the side. This would also take advantage of the UAV ability to land on a small target while away from any obstacles or surfaces that interfere with the UAV's propeller wash (which makes stable landing harder), and then once the UAV lands, the UAV and the nest may be retracted into a secure enclosure.

Software running on a processing apparatus in an unmanned aerial vehicle and/or on a processing apparatus in a dock for the UAV may be used to implement the autonomous landing techniques described herein.

For example, a robust estimation and re-localization procedure may include visual relocalization of a dock with a landing surface at multiple scales. For example, the UAV software may support a GPS→visual localization transition. In some implementations, arbitrary fiducial (e.g., visual tag) designs, sizes, and orientations around dock may be supported. For example, software may enable detection and rejection of spurious detections.

For example, a takeoff and landing procedure for UAV may include robust planning & control in wind using model-based wind estimation and/or model-based wind compensation. For example, a takeoff and landing procedure for UAV may include a landing "honing procedure," which may stop shortly above the landing surface of a dock. Since State estimation and visual detection is more accurate than control in windy environments, wait until the position, velocity, and angular error between the actual vehicle and fiducial on the landing surface is low before committing to land. For example, a takeoff and landing procedure for UAV may include a dock-specific landing detection and abort procedure. For example, actual contact with dock may be detected and the system may differentiate between a successful landing and a near-miss. For example, a takeoff and landing procedure for UAV may include employing a slow, reverse motor spin to enable self-retracting propellers.

In some implementations, a takeoff and landing procedure for UAV may include support for failure cases and fallback behavior, such as, setting a predetermined land position in the case of failure; going to another box; an option to land on top of dock if box is jammed, etc.

For example, an application programming interface design may be provided for single-drone, single-dock operation. For example, skills may be performed based on a schedule, or as much as possible given battery life or recharge rate.

For example, an application programming interface design for N drones with M docks operation may be provided. In some implementations, mission parameters may be defined, such that, UAVs (e.g., drones) are automatically dispatched and recalled to constantly satisfy mission parameters with overlap.

A UAV may be configured to automatically fold propellers to fit in the dock. For example, the dock may be smaller than the full UAV. Persistent operation can be achieved with multiple UAVs docking, charging, performing missions, waiting in standby to dock, and/or charging in coordination. In some implementations, a UAV is automatically serviced while it is in position within the dock. For example, automated servicing of a UAV may include: charging a battery, cleaning sensors, cleaning and/or drying the UAV more generally, changing a propeller, and/or changing a battery.

A UAV may track its state (e.g., a pose including a position and an orientation) using a combination of sensing modalities (e.g., visual inertial odometry (VIO) and global positioning system (GPS) based operation) to provide robustness against drift.

In some implementations, during takeoff and landing, as a UAV approaches the dock it constantly hones in on the landing spot. The honing process may make a takeoff and landing procedure robust against wind, ground effect, & other disturbances. For example, intelligent honing may use position, heading, and trajectory to get within a very tight tolerance. In some implementations, rear motors may reverse to get in.

Some implementations may provide advantages over earlier systems, such as; a small, inexpensive, and simple dock; retraction mechanism may allow for stacking and mitigate aerodynamic turbulence issues around landing; robust visual landing that may be more accurate; automated retraction of propeller to enable tight packing during charging, maintenance, and storage of UAV; vehicle may be serviced while docked without human intervention; persistent autonomous operation of multiple vehicles via dock, SDK, vehicles, & services (hardware & software).

Figure 3:
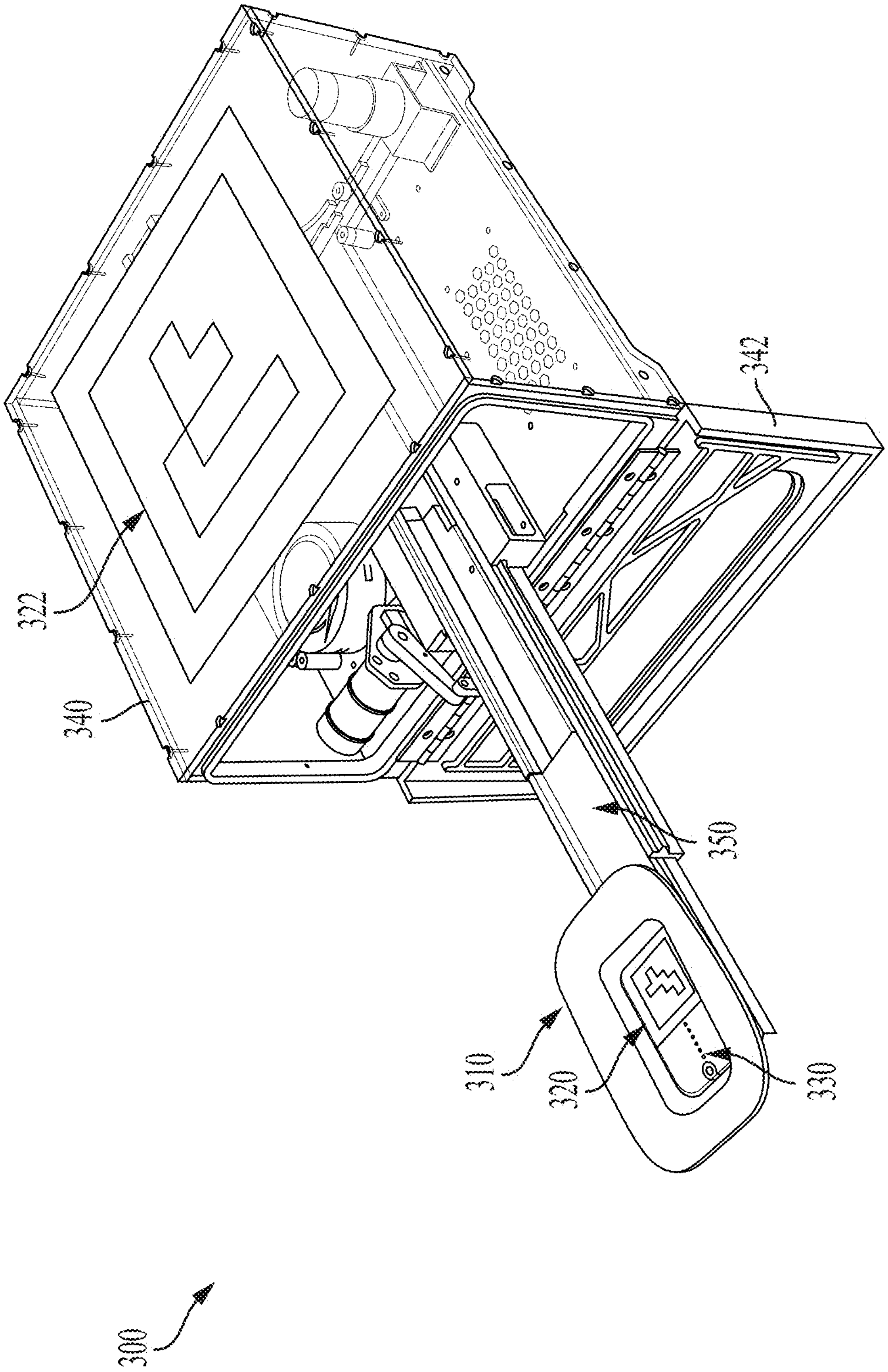
FIG. 3 is an illustration of an example of a dock for facilitating autonomous landing of an unmanned aerial vehicle.

FIG. 3 is an illustration of an example of a dock 300 for facilitating autonomous landing of an unmanned aerial vehicle. The dock 300 includes a landing surface 310 with a fiducial 320 and charging contacts 330 for a battery charger. The dock 300 includes a box 340 in the shape of a rectangular box with a door 342. The dock 300 includes a retractable arm 350 that supports the landing surface 310 and enables the landing surface 310 to be positioned outside the box 340, to facilitate takeoff and landing of an unmanned aerial vehicle, or inside the box 340, for storage and/or servicing of an unmanned aerial vehicle. The dock 300 includes a second, auxiliary fiducial 322 on the outer top surface of the box 340. The root fiducial 320 and the auxiliary fiducial 322 may be detected and used for visual localization of the unmanned aerial vehicle in relation the dock 300 to enable a precise landing on a small landing surface 310. For example, the techniques described in U.S. Patent Application No. 62/915,639, which is incorporated by reference herein, may be used to land an unmanned aerial vehicle on the landing surface 310 of the dock 300.

The dock 300 includes a landing surface 310 configured to hold an unmanned aerial vehicle (e.g., the unmanned aerial vehicle 200 of FIG. 2) and a fiducial 320 on the landing surface 310. The landing surface 310 has a funnel geometry shaped to fit a bottom surface of the unmanned aerial vehicle at a base of the funnel. The tapered sides of the funnel may help to mechanically guide the bottom surface of the unmanned aerial vehicle into a centered position over the base of the funnel during a landing. For example, corners at the base of the funnel may server to prevent the aerial vehicle from rotating on the landing surface 310 after the bottom surface of the aerial vehicle has settled into the base of the funnel shape of the landing surface 310. For example, the fiducial 320 may include an asymmetric pattern that enables robust detection and determination of a pose (i.e., a position and an orientation) of the fiducial 320 relative to the unmanned aerial vehicle based on an image of the fiducial 320 captured with an image sensor of the unmanned aerial vehicle. For example, the fiducial 320 may include a visual tag from the AprilTag family.

The dock 300 includes conducting contacts 330 of a battery charger on the landing surface 310, positioned at the bottom of the funnel. The dock 300 includes a charger configured to charge the battery while the unmanned aerial vehicle is on the landing surface 310.

The dock 300 includes a box 340 configured to enclose the landing surface 310 in a first arrangement (shown in FIG. 4) and expose the landing surface 310 in a second arrangement (shown in FIGS. 3 and 3). The dock 300 may be configured to transition from the first arrangement to the second arrangement automatically by performing steps including opening a door 342 of the box 340 and extending the retractable arm 350 to move the landing surface 310 from inside the box 340 to outside of the box 340. The auxiliary fiducial 322 is located on an outer surface of the box 340.

The dock 300 includes a retractable arm 350 and the landing surface 310 is positioned at an end of the retractable arm 350. When the retractable arm 350 is extended, the landing surface 310 is positioned away from the box 340 of the dock 300, which may reduce or prevent propeller wash from the propellers of an unmanned aerial vehicle during a landing, thus simplifying the landing operation. The retractable arm 350 may include aerodynamic cowling for redirecting propeller wash to further mitigate the problems of propeller wash during landing.

For example, the fiducial 320 may be a root fiducial, and the auxiliary fiducial 322 is larger than the root fiducial 320 to facilitate visual localization from farther distances as an unmanned aerial vehicle approaches the dock 300. For example, the area of the auxiliary fiducial 322 may be 25 times the area of the root fiducial 320. For example, the auxiliary fiducial 322 may include an asymmetric pattern that enables robust detection and determination of a pose (i.e., a position and an orientation) of the auxiliary fiducial 322 relative to the unmanned aerial vehicle based on an image of the auxiliary fiducial 322 captured with an image sensor of the unmanned aerial vehicle. For example, the auxiliary fiducial 322 may include a visual tag from the AprilTag family. For example, a processing apparatus (e.g., the processing apparatus 410) of the unmanned aerial vehicle may be configured to detect the auxiliary fiducial 322 in at least one of one or more images captured using an image sensor of the unmanned aerial vehicle; determine a pose of the auxiliary fiducial 322 based on the one or more images; and control, based on the pose of the auxiliary fiducial, the propulsion mechanism to cause the unmanned aerial vehicle to fly to a first location in a vicinity of the landing surface 310. Thus, the auxiliary fiducial 322 may facilitate the unmanned aerial vehicle getting close enough to the landing surface 310 to enable detection of the root fiducial 320.

The dock 300 may enable automated landing and recharging of an unmanned aerial vehicle, which may in turn enable automated scanning of a large roof that requires more than one battery pack charge to scan to be automatically scanned without user intervention. For example, an unmanned aerial vehicle may be configured to: after starting and before completing the scan plan, storing a scan plan state indicating a next pose of the sequence of poses of the scan plan; after storing the scan plan state, controlling the propulsion mechanism to cause the unmanned aerial vehicle to fly to land; after landing, controlling the propulsion mechanism to cause the unmanned aerial vehicle to fly to take off; accessing the scan plan state; and, based on the scan plan state, controlling the propulsion mechanism to cause the unmanned aerial vehicle to fly to assume the next pose and continue execution of the scan plan. In some implementations, controlling the propulsion mechanism to cause the unmanned aerial vehicle to fly to land includes: controlling a propulsion mechanism of an unmanned aerial vehicle to cause the unmanned aerial vehicle to fly to a first location in a vicinity of a dock (e.g., the dock 300) that includes a landing surface (e.g., the landing surface 310) configured to hold the unmanned aerial vehicle and a fiducial on the landing surface; accessing one or more images captured using an image sensor of the unmanned aerial vehicle; detecting the fiducial in at least one of the one or more images; determining a pose of the fiducial based on the one or more images; and controlling, based on the pose of the fiducial, the propulsion mechanism to cause the unmanned aerial vehicle to land on the landing surface. For example, this technique of automated landings may include automatically charge a battery of the unmanned aerial vehicle using a charger included in the dock while the unmanned aerial vehicle is on the landing surface.

Figure 4:
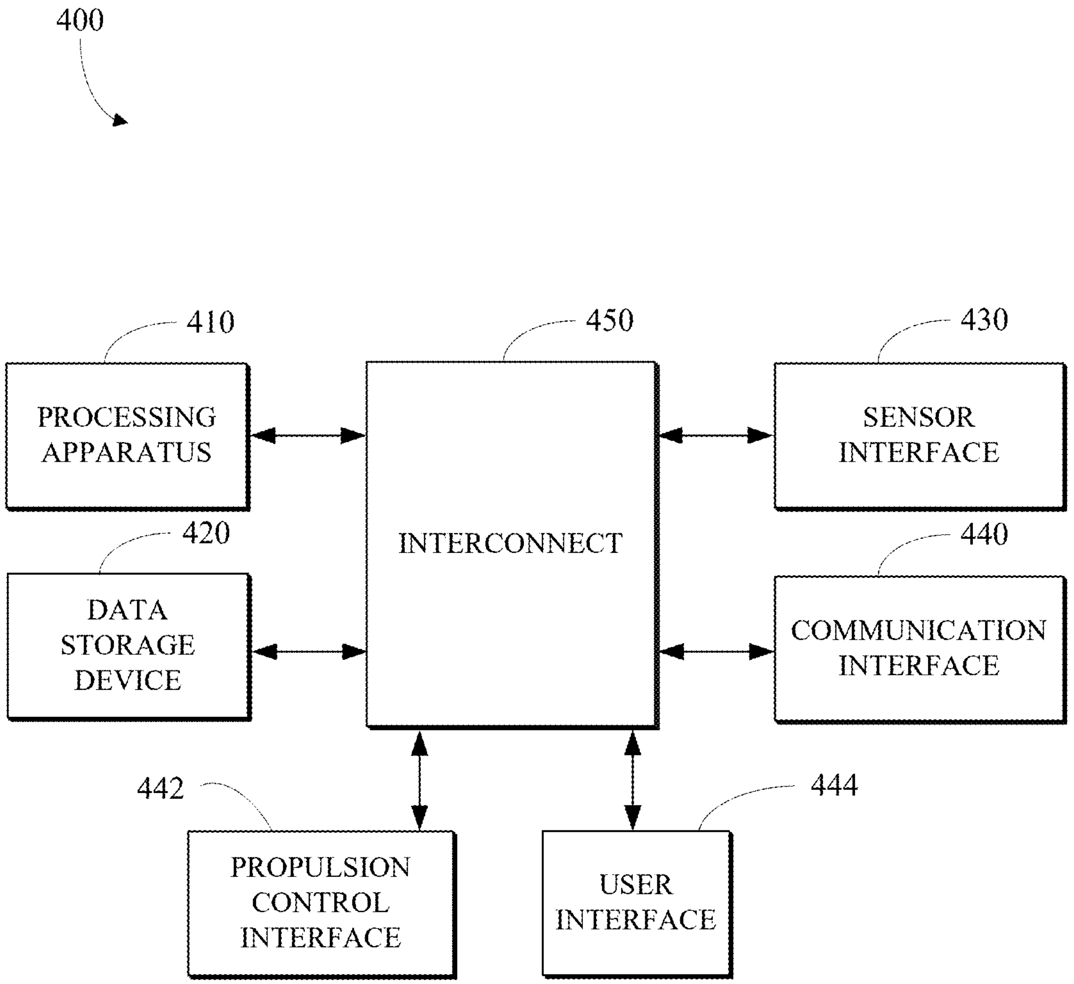
FIG. 4 is a block diagram of an example of a hardware configuration of an unmanned aerial vehicle.

FIG. 4 is a block diagram of an example of a hardware configuration 400 of an unmanned aerial vehicle. The hardware configuration may include a processing apparatus 410, a data storage device 420, a sensor interface 430, a communications interface 440, propulsion control interface 442, a user interface 444, and an interconnect 450 through which the processing apparatus 410 may access the other components. For example, the hardware configuration 400 may be or be part of an unmanned aerial vehicle (e.g., the unmanned aerial vehicle 200). For example, the unmanned aerial vehicle may be configured for using software version-aware encryption keys for secure mutable partitions. For example, the unmanned aerial vehicle may be configured to implement the process 600 of FIG. 6, the process 700 of FIG. 7, and/or the process 800 of FIG. 8. In some implementations, the unmanned aerial vehicle may be configured to detect one or more fiducials on a dock (e.g., the dock 300) use estimates of the pose of the one or more fiducials to land on a small landing surface to facilitate automated maintenance of the unmanned aerial vehicle.

The processing apparatus 410 is operable to execute instructions that have been stored in a data storage device 420. In some implementations, the processing apparatus 410 is a processor with random access memory for temporarily storing instructions read from the data storage device 420 while the instructions are being executed. The processing apparatus 410 may include single or multiple processors each having single or multiple processing cores. Alternatively, the processing apparatus 410 may include another type of device, or multiple devices, capable of manipulating or processing data. For example, the data storage device 420 may be a non-volatile information storage device such as, a solid-state drive, a read-only memory device (ROM), an optical disc, a magnetic disc, or any other suitable type of storage device such as a non-transitory computer readable memory. The data storage device 420 may include another type of device, or multiple devices, capable of storing data for retrieval or processing by the processing apparatus 410. The processing apparatus 410 may access and manipulate data stored in the data storage device 420 via interconnect 450. For example, the data storage device 420 may store instructions executable by the processing apparatus 410 that upon execution by the processing apparatus 410 cause the processing apparatus 410 to perform operations (e.g., operations that implement the process 600 of FIG. 6, the process 700 of FIG. 7, and/or the process 800 of FIG. 8).

The sensor interface 430 may be configured to control and/or receive data (e.g., temperature measurements, pressure measurements, a global positioning system (GPS) data, acceleration measurements, angular rate measurements, magnetic flux measurements, and/or a visible spectrum image) from one or more sensors (e.g., including the image sensor 220). In some implementations, the sensor interface 430 may implement a serial port protocol (e.g., I2C or SPI) for communications with one or more sensor devices over conductors. In some implementations, the sensor interface 430 may include a wireless interface for communicating with one or more sensor groups via low-power, short-range communications (e.g., a vehicle area network protocol).

The communications interface 440 facilitates communication with other devices, for example, a paired dock (e.g., the dock 300), a specialized controller, or a user computing device (e.g., a smartphone or tablet). For example, the communications interface 440 may include a wireless interface, which may facilitate communication via a Wi-Fi network, a Bluetooth link, or a ZigBee link. For example, the communications interface 440 may include a wired interface, which may facilitate communication via a serial port (e.g., RS-232 or USB). The communications interface 440 facilitates communication via a network.

The propulsion control interface 442 may be used by the processing apparatus to control a propulsion system (e.g., including one or more propellers driven by electric motors). For example, the propulsion control interface 442 may include circuitry for converting digital control signals from the processing apparatus 410 to analog control signals for actuators (e.g., electric motors driving respective propellers). In some implementations, the propulsion control interface 442 may implement a serial port protocol (e.g., I2C or SPI) for communications with the processing apparatus 410. In some implementations, the propulsion control interface 442 may include a wireless interface for communicating with one or more motors via low-power, short-range communications (e.g., a vehicle area network protocol).

The user interface 444 allows input and output of information from/to a user. In some implementations, the user interface 444 can include a display, which can be a liquid crystal display (LCD), a light emitting diode (LED) display (e.g., an OLED display), or other suitable display. For example, the user interface 444 may include a touchscreen. For example, the user interface 444 may include buttons. For example, the user interface 444 may include a positional input device, such as a touchpad, touchscreen, or the like; or other suitable human or machine interface devices.

For example, the interconnect 450 may be a system bus, or a wired or wireless network (e.g., a vehicle area network). In some implementations (not shown in FIG. 4), some components of the unmanned aerial vehicle may be omitted, such as the user interface 444.

Figure 5:
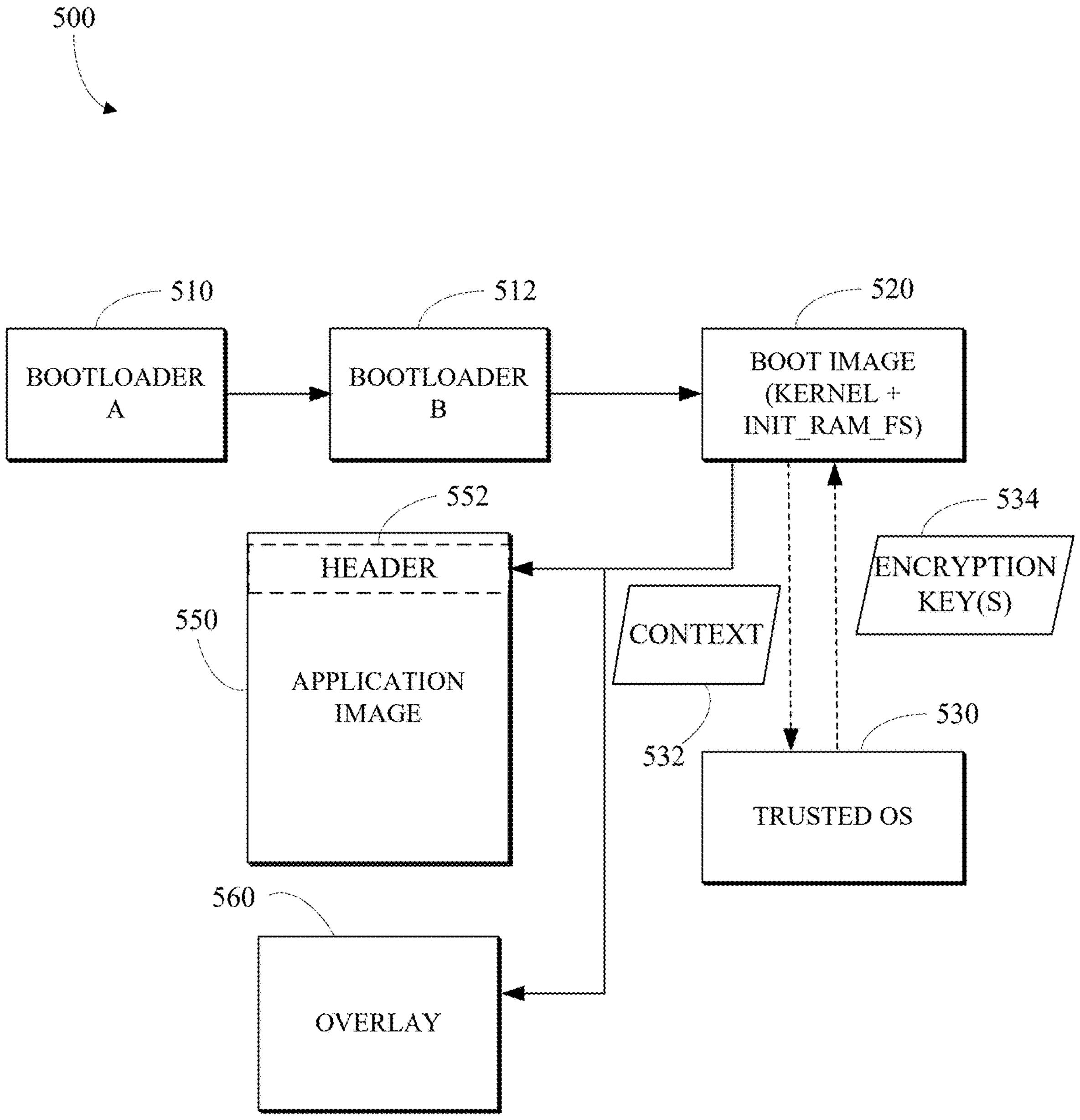
FIG. 5 is an illustration of an example of boot sequence for using a software version-aware encryption key for secure mutable partitions.

FIG. 5 is an illustration of an example of boot sequence 500 for using a software version-aware encryption key for secure mutable partitions. The boot sequence 500 may be implemented by a wide variety of computing devices, such as, for example, the unmanned aerial vehicle 110, the controller 120, and/or the docking station 130 of FIG. 1.

The boot sequence 500 starts by running a sequence of bootloaders starting, in this example, with bootloader A 510, which may be stored in a first partition of a data storage device (e.g., a hard drive) and loaded into random access memory for execution, followed by bootloader B 512, which may be stored in a second partition of the data storage device and loaded into random access memory for execution. In some implementations, each bootloader in the boot sequence 500 may be cryptographically verified (e.g., verified by a bootloader in a previous stage based on a trusted signature) before it is executed. While two bootloader stages (510 and 512) are shown in the example boot sequence 500, various numbers of bootloader stages may be utilized.

The boot sequence 500 culminates when the boot image 520 is verified and loaded in random access memory (RAM) for execution. The boot image 520 may include the kernel of the operating system being loaded and initialization RAM file system (i.e., a small file system sized to fit in random access memory with the kernel that may be used in the final boot stage to access and verify a full application image 550 (e.g., including a root file system for the operating system with application software binaries) stored in one or more partitions on the data storage device. For example, a processor executing the boot image 520 may interface with a trusted operating system 530 (e.g., running in a trusted execution environment integrated on silicon with the processor) to determine one or more encryption keys used to encrypt the application image 550 and to verify the application image 550. The application image 520 includes a header 552 that may be signed by a trusted entity and this digital signature may be cryptographically verified by the boot image 520. For example, the header 552 may include a hash (e.g., a root hash of a hash tree) of the application image 520 and/or a version number string, which may have been randomly or pseudo-randomly generated. In some implementations, the application image 550 is stored in one or more read-only partitions of the data storage device.

The boot image 520 also accesses one or more writable partitions on the data storage device, including an overlay mount 560. The data stored in the overlay mount 560 may be encrypted using an encryption key 534 derived using the trusted operating system 530 based on device specific data (e.g., from a set of fuses) and context data 532 that is specific to a version of the application image 520. For example, the context data 532 may include a hash of the application image 520 and/or a version number string from the header 552. For example, the overlay mount 560 may be used to store a cache of data (e.g., including configuration parameters) used by an operating system running on the device. This encryption key 534 may be generated each time the boot sequence 500 is executed. The encryption key 534 may be used to write/read data to/from the overlay mount 560. If the data read from the overlay mount 560 using the encryption key 534 is corrupted, it may indicate that the application image 520 has been updated or otherwise changed since the data being read from the overlay mount 560 was written to the overlay mount 560. This stale data may pose a security risk. In some implementations, the overlay mount 560 may be reformatted to flush out stale data responsive to detection of corruption of data in the overlay mount 560.

Figure 6:
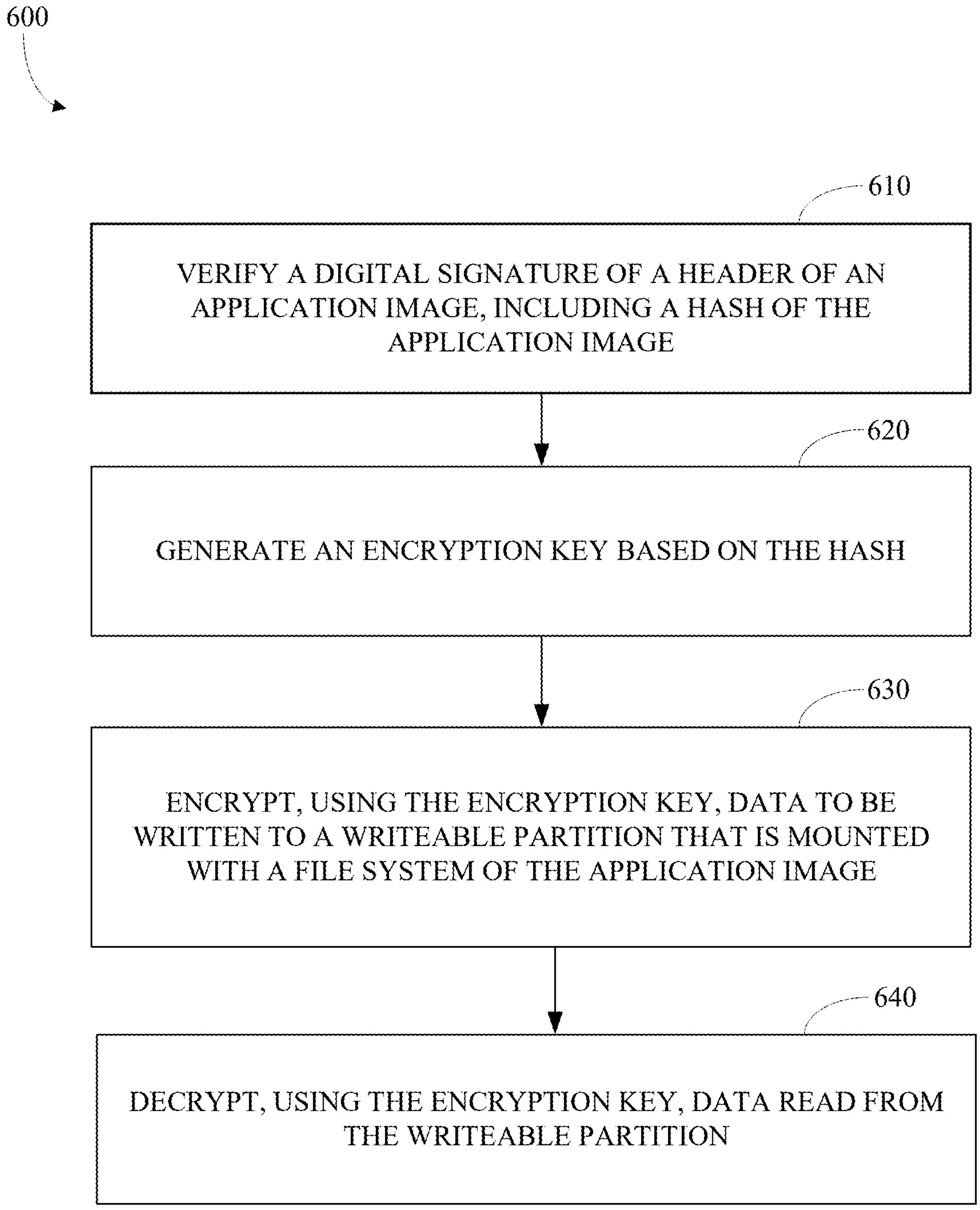
FIG. 6 is a flowchart of an example of a process for using a software version-aware encryption key for secure mutable partitions.

FIG. 6 is a flowchart of an example of a process 600 for using a software version-aware encryption key for secure mutable partitions. The process 600 includes verifying 610 a digital signature of a header for an application image, wherein the header includes a hash of the application image; generating 620 an encryption key based on the hash; encrypting 630, using the encryption key, data to be written to a writable partition that is mounted with a filesystem of the application image; and decrypting 640, using the encryption key, data read from the writable partition. For example, the process 600 may be implemented by the unmanned aerial vehicle 110 of FIG. 1. For example, the process 600 may be implemented by the controller 120 of FIG. 1. For example, the process 600 may be implemented by the docking station 130 of FIG. 1. For example, the process 600 may be implemented by the unmanned aerial vehicle 200 of FIGS. 2A-B. For example, the process 600 may be implemented by the controller 250 of FIG. 2C. For example, the process 600 may be implemented by a processing apparatus of the dock 300 of FIG. 3. For example, the process 600 may be implemented using the hardware configuration 400 of FIG. 4. For example, the process 600 may be implemented using the system 900 of FIG. 9.

The process 600 includes verifying 610 a digital signature of a header for an application image, wherein the header includes a hash of the application image. For example, the application image may include a root file system (e.g., a root file system of an operating system). In some implementations, the application image includes a collection of one more executable binaries for application software. The digital signature may be associated with a trusted entity (e.g., a trusted software developer or an administrator of the device implementing the process 600). For example, the hash may be a root hash of a hash tree, where the leaves of the hash tree may correspond to different portions of the application image. In some implementations, the header includes a version string for the application image. For example, the version string may have been generated randomly or pseudo randomly to make it difficult for attackers to predict version string and thwart attempts to spoof the header for the application image. For example, the application image may be stored in one or more read-only partitions of a data storage device (e.g., the data storage device 420). In some implementations, verifying 610 a digital signature of a header for an application image includes using a public-key cryptographic method such as the Rivest, Shamir, and Adleman (RSA) algorithm or the Elliptic Curve Digital Signature Algorithm (ECDSA).

The process 600 includes generating 620 an encryption key based on the hash. For example, generating 620 the encryption key may include using a trusted operating system device that is configured to apply a key generation algorithm to determine the encryption key based on a context string and a fuse key of the trusted operating system device. For example, the key generation algorithm may be compliant with the NIST800-108 standard. For example, the key generation algorithm may include an HMAC-based Extract-and-Expand Key Derivation Function (HKDF), where HMAC is a hash-based message authentication code. For example, the encryption key may be a symmetric key. For example, the encryption key may be a pair of asymmetric keys (e.g., a private key and a corresponding public key) that are respectively used for performing encryption and decryption. In some implementations, a context string used to generate the encryption key using a key generation algorithm includes additional information with the hash. For example, the encryption key may be generated based on the version string (e.g., a version string that has been randomly or pseudo-randomly generated) for the application image. In some implementations, the context string includes at least one of an overlay name, a slot number, and/or a lock state for a writable partition (e.g., an overlay mount). For example, additional information may be concatenated with the hash to form a context string to which a key generation algorithm is applied. For example, generating 620 the encryption key may include implementing the process 700 of FIG. 7.

The process 600 includes encrypting 630, using the encryption key, data to be written to a writable partition (e.g., an overlay mount) that is mounted with a filesystem of the application image. For example, the writable partition may be used by an operating system (e.g., Linux) to store a cache of data (e.g., including configuration parameters). In some implementations, the writable partition is an overlay mount of the filesystem of the application image. Examples of writable partitions may include, without limitation, cache partitions, temporary storage partitions, or user-specific data partitions. The writable partition may be integrated with a read-only partition in a filesystem structure, enabling a seamless interaction between the mutable and immutable portions of the software. This integration may be achieved through various methods, such as overlay mounting, which allows the writable partition to overlay the read-only partition, creating a unified filesystem view. Examples of overlay mounting techniques may include, without limitation, union mounts, overlayfs, and aufs. In some implementations, the encryption process may be performed within a trusted execution environment to isolate the encryption operations from potential vulnerabilities in the broader system. For example, data to be written to a writable partition may be encrypted 630 using Advanced Encryption Standard with Galois/Counter Mode (AES-GCM) encryption.

The process 600 includes decrypting 640, using the encryption key, data read from the writable partition (e.g., an overlay mount). In scenarios where the application image has been changed since the data being decrypted 640 was written to the writable partition, the encryption key used for decryption 640 may be highly unlikely to match the encryption key that was used to encrypt the data written to the writable partition, because the encryption keys depend on the current version of the application image via the hash and/or the version string. For example, the encryption key may be generated 620 as a step in a boot sequence (e.g., the boot sequence 500) each time a device implementing the process 600 is rebooted. This mismatch in the encryption keys used for encryption versus decryption of the data may result in corruption of the decrypted data read from the writable partition. This corruption may be detected (e.g., using an error detection code, such as parity checks), which may provide an indication that the application image has been changed rendering the data stored in the writable partition stale. This stale data is not useful and could pose a security risk, since it could otherwise provide a channel for data injection from a compromised older version of the application image. Therefore, it may be beneficial to flush the data stored in the writable partition when corruption of this data is detected. For example, the process 800 of FIG. 8 may implemented together with the process 600 to flush stale data from the writable partition responsive to detecting a software version change. In some implementations, decrypting 640, using the encryption key, data read from the writable partition, may include using the encryption key within a secure enclave of a trusted execution environment (TEE). The TEE may ensure that encryption keys remain inaccessible to the primary processor, preventing unauthorized key extraction via side-channel attacks or direct memory access (DMA) exploits.

The order of the encryption step 630 and decryption step 640 may be reversed. For example, an operating system may cause data to read from a cache in the writable partition (e.g., an overlay mount) immediately after a boot sequence completes, where the operating system wrote the data in encrypted form to the cache during a previous session before the last boot sequence. This read and decrypt operation on the cache in the writable partition may lead to the detection of corruption where the application image has been changed since the data was written to the cache, which could in turn trigger a reformatting of the writable partition (e.g., using the process 800 of FIG. 8). Otherwise, new data may be encrypted and stored in a cache in the writable partition as and when needed by the application software (e.g., operating system software) of the application image.

Figure 7:
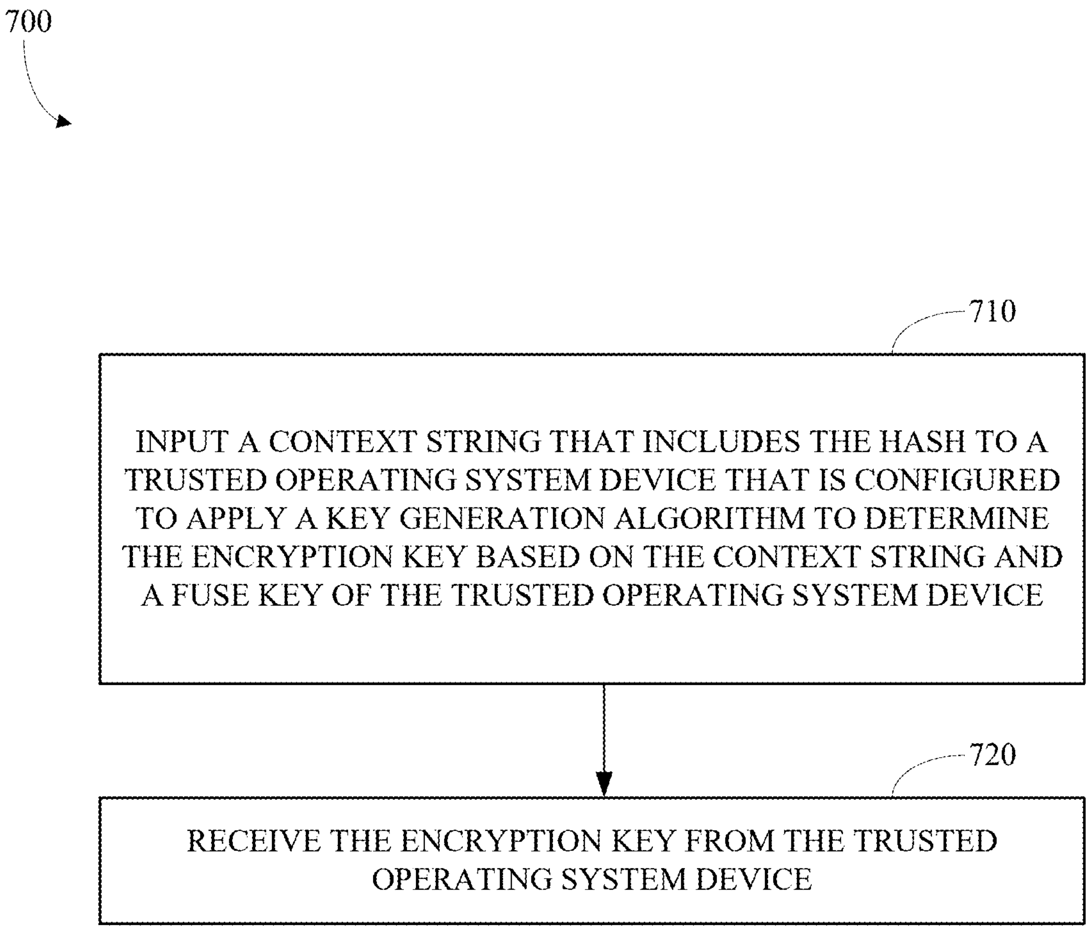
FIG. 7 is a flowchart of an example of a process for generating a software version-aware encryption key.

FIG. 7 is a flowchart of an example of a process 700 for generating a software version-aware encryption key. The process 700 includes inputting 710 a context string that includes the hash to a trusted operating system device that is configured to determine the encryption key based on the context string and a fuse key; and receiving 720 the encryption key from the trusted operating system device. For example, the process 700 may be implemented by the unmanned aerial vehicle 110 of FIG. 1. For example, the process 700 may be implemented by the controller 120 of FIG. 1. For example, the process 700 may be implemented by the docking station 130 of FIG. 1. For example, the process 700 may be implemented by the unmanned aerial vehicle 200 of FIGS. 2A-B. For example, the process 700 may be implemented by the controller 250 of FIG. 2C. For example, the process 700 may be implemented by a processing apparatus of the dock 300 of FIG. 3. For example, the process 700 may be implemented using the hardware configuration 400 of FIG. 4. For example, the process 700 may be implemented using the system 900 of FIG. 9.

The process 700 includes inputting 710 a context string that includes the hash to a trusted operating system device that is configured to apply a key generation algorithm to determine the encryption key based on the context string and a fuse key of the trusted operating system device. For example, the trusted operating system device may run the trusted operating system 530. In some implementations, trusted operating system device includes trusted execution environment hardware that is part of an integrated circuit (e.g. on a single silicon chip) with a processor that is being used to implement the process 600 of FIG. 6. In some implementations, trusted operating system device is on a separate chip communicates with a processor being used to implement the process 600 of FIG. 6 via a cable or a system bus. For example, the key generation algorithm may be compliant with the NIST800-108 standard. For example, the key generation algorithm may include an HMAC-based Extract-and-Expand Key Derivation Function (HKDF). In some implementations, the context string may include additional data concatenated with the hash. For example, the encryption key may be generated based on the version string (e.g., a version string that has been randomly or pseudo-randomly generated) for the application image. In some implementations, the context string includes at least one of an overlay name, a slot number, and/or a lock state for a writable partition (e.g., an overlay mount).

The process 700 includes receiving 720 the encryption key from the trusted operating system device. The encryption key may be a cryptographic key generated within the trusted operating system device, based on both a device-specific secret key and an identifier string associated with the software version. Examples of encryption keys may include, without limitation, symmetric keys used for AES encryption, keys derived through key derivation functions (KDFs), or other cryptographic keys suitable for securing data. Upon derivation, the encryption key is securely transmitted to the system, where it may be utilized to encrypt data to be written to a writable partition of a data storage device. In some implementations, the encryption process may employ advanced cryptographic algorithms, such as AES-256.

Figure 8:
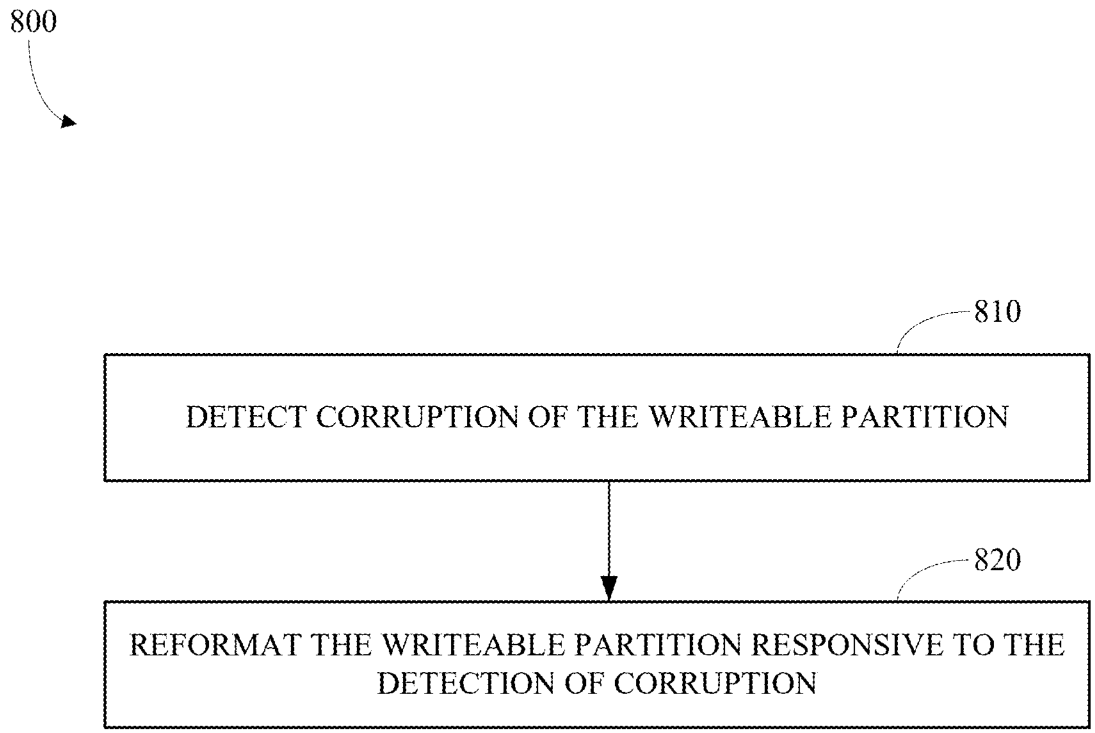
FIG. 8 is a flowchart of an example of a process for flushing stale data responsive to detecting a software version change.

FIG. 8 is a flowchart of an example of a process 800 for flushing stale data responsive to detecting a software version change. The process 800 includes detecting 810 corruption of the writable partition; and reformatting 820 the writable partition responsive to the detection of corruption. For example, the process 800 may be implemented by the unmanned aerial vehicle 110 of FIG. 1. For example, the process 800 may be implemented by the controller 120 of FIG. 1. For example, the process 800 may be implemented by the docking station 130 of FIG. 1. For example, the process 800 may be implemented by the unmanned aerial vehicle 200 of FIGS. 2A-B. For example, the process 800 may be implemented by the controller 250 of FIG. 2C. For example, the process 800 may be implemented by a processing apparatus of the dock 300 of FIG. 3. For example, the process 800 may be implemented using the hardware configuration 400 of FIG. 4. For example, the process 800 may be implemented using the system 900 of FIG. 9.

The process 800 includes detecting 810 corruption of the writable partition (e.g., an overlay mount). Corruption detection may involve attempting to decrypt data stored in the writable partition using the newly derived encryption key. If the decryption attempt fails, the system may identify the partition as corrupted. For example, corruption of the writable partition may be detected 810 using an error detection code, such as parity checks on words or other blocks of the data. Some implementations may include additional detection mechanisms, such as checksum verification or integrity checks (e.g., during a boot process).

The process 800 includes reformatting 820 the writable partition (e.g., an overlay mount) responsive to the detection of corruption. Reformatting, as described herein, generally refers to erasing and reinitializing a storage partition, typically involving the creation of a new filesystem structure. Examples of reformatting operations may include initializing a partition with a new ext4 filesystem or performing a low-level format to remove all existing data. For example, a processor, in conjunction with a trusted execution environment, may facilitate this operation by ensuring that the writable partition is securely reformatted 820 to prevent unauthorized access or residual malicious data. In some implementations, reformatting 820 may be triggered automatically by the system upon detecting corruption. A trusted execution environment may ensure that sensitive operations, such as deriving encryption keys, are securely executed. Some implementations may include enhanced reformatting techniques, such as employing hardware-based secure erase commands or integrating machine learning algorithms to optimize the reformatting process. These approaches collectively ensure that the writable partition is securely reset and prepared for subsequent use, maintaining the integrity of the secure data storage system.

Figure 9:
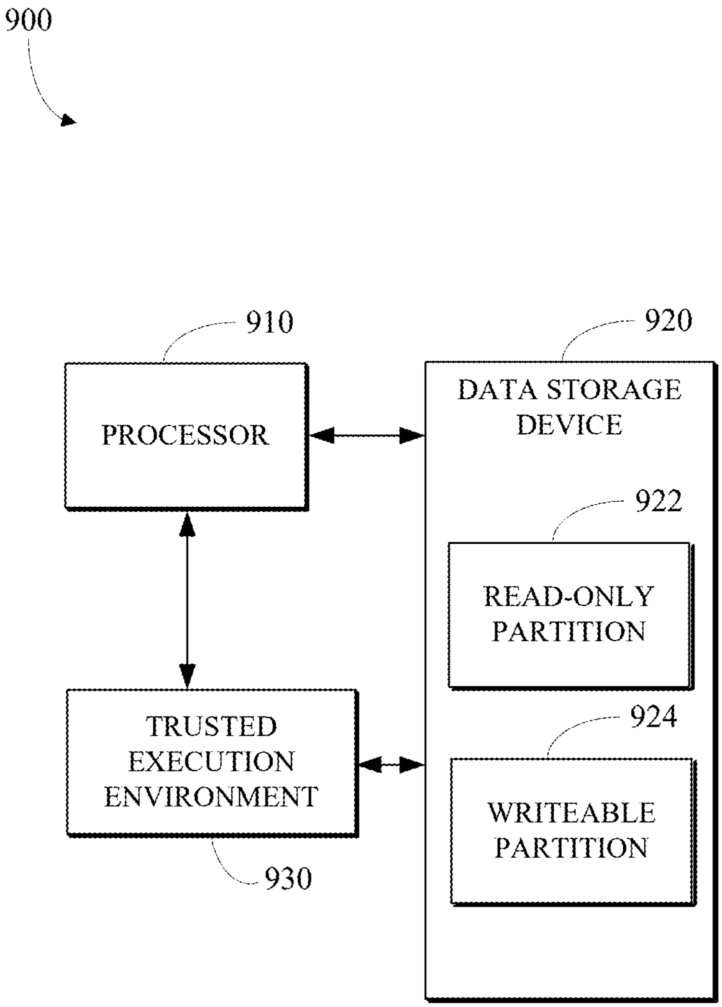
FIG. 9 is a block diagram of an example of a system configured for using a software version-aware encryption key for secure mutable partitions.

FIG. 9 is a block diagram of an example of a system 900 configured for using a software version-aware encryption key for secure mutable partitions. The system 900 may include a data storage device 920, which includes a read-only partition 922 and a writable partition 924. Additionally, the system 900 comprises a trusted execution environment 930 and a processor 910. The figure visually represents the structural arrangement and functional relationships among these components within the system 900. For example, the system 900 may be configured to implement the process 600 of FIG. 6. For example, the system 900 may be configured to implement the process 700 of FIG. 7. For example, the system 900 may be configured to implement the process 800 of FIG. 8.

The system 900 includes a data storage device 920, which is further divided into two or more partitions, including a read-only partition 922 and a writable partition 924. The read-only partition 922 may store signature-verified software, ensuring the integrity and authenticity of the software executed by the system 900. Examples of signature-verified software may include, without limitation, secure bootchains or operating system images with embedded digital signatures. The writable partition 924 may store cache data, such as temporary files or application-specific data that can be regenerated if lost. The writable partition 924 is integrated with the read-only partition 922 within a filesystem structure, enabling seamless operation while maintaining the security of the read-only partition. In some implementations, the writable partition 924 may be encrypted using a device-specific encryption key derived from the trusted execution environment 930.

The trusted execution environment 930, as shown in FIG. 9, serves as a secure processing region for executing sensitive operations. It may store a device-specific secret key, generate an identifier string uniquely associated with the software version, and/or derive an encryption key based on the secret key and identifier string. Examples of trusted execution environments may include hardware-isolated secure processing regions or software-based secure enclaves. Examples of trusted execution environments may include, without limitation, ARM TrustZone, Intel SGX, and AMD SEV. The trusted execution environment 930 utilizes the device-specific secret key and the identifier string, which may be a random value associated with the software version, to derive the encryption key. This may ensure that the key is both unique to the device and specific to the software version. The derived encryption key may be used to encrypt data to be written to the writable partition 924, enhancing the security of the system. In some implementations, the trusted execution environment 930 may utilize advanced cryptographic techniques, such as HMAC-based Extract-and-Expand Key Derivation Function (HKDF), to generate encryption keys.

The processor 910, as described herein, is configured to encrypt data to be written to the writable partition 924 using the derived encryption key. This encryption ensures that data stored in the writable partition 924 remains secure and inaccessible to unauthorized entities. Additionally, the processor 910 may detect corruption of the writable partition 924, particularly after a software version change, and reformat the partition in response to such detection. The reformatting process may include securely erasing existing data to prevent unauthorized recovery. In some implementations, the processor 910 may also integrate the writable partition 924 with the read-only partition 922 within the filesystem structure, enabling seamless operation while maintaining security.

Some implementations of the system may include variations in the integration of the writable and read-only partitions, such as the use of overlay mounting techniques, or additional security measures within the trusted execution environment 930 to further mitigate potential vulnerabilities. The interplay between these components, as shown in FIG. 9, highlights their roles in achieving a secure and reliable data storage system. The figure collectively represents the functional relationships and interactions between these components, emphasizing their contributions to the overall security architecture.

The system 900 for secure data storage includes a data storage device 920 including a read-only partition 922 storing signature-verified software, and a writable partition 924 configured to store cache data; a trusted execution environment 930 configured to: store a device-specific secret key, generate an identifier string for a software version, and derive an encryption key based on the device-specific secret key and the identifier string; and a processor 910 configured to: encrypt data to be written to the writable partition 924 using the derived encryption key, integrate the writable partition 924 with the read-only partition 922 in a filesystem structure, detect corruption of the writable partition 924 upon software version change, and reformat the writable partition 924 upon detection of corruption. In some implementations, the signature-verified software includes a secure bootchain configured to verify digital signatures of successive boot stages before execution. For example, the writable partition 924 may be mounted over the read-only partition using overlay mounting. For example, the trusted execution environment 930 may include a hardware-isolated secure processing region. For example, the identifier string may include a random value uniquely associated with the software version. In some implementations, deriving the encryption key includes applying a key derivation function to combine the device-specific secret key and the identifier string. For example, detecting corruption may include attempting to decrypt data using a new encryption key derived after the software version change.

Disclosed herein are implementations using software version-aware encryption keys for secure mutable partitions.

In a first aspect, the subject matter described in this specification can be embodied in systems that include an unmanned aerial vehicle comprising: a propulsion mechanism, one or more image sensors, and a processing apparatus that is configured to: verify a digital signature of a header for an application image, wherein the header includes a hash of the application image; generate an encryption key based on the hash; encrypt, using the encryption key, data to be written to a writable partition that is mounted with a filesystem of the application image; and decrypt, using the encryption key, data read from the writable partition.

In the first aspect, the header may include a version string for the application image and the encryption key may be generated based on the version string for the application image. In the first aspect, the processing apparatus is configured to input a context string that includes the hash to a trusted operating system device that is configured to apply a key generation algorithm to determine the encryption key based on the context string and a fuse key of the trusted operating system device. In the first aspect, the context string may include at least one of an overlay name, a slot number, or a lock state for the writable partition. For example, the key generation algorithm may be compliant with an NIST800-108 standard. In the first aspect, the hash may be a root hash of a hash tree. In the first aspect, the application image may include a root file system. In the first aspect, the writable partition may be an overlay mount of the filesystem of the application image. In the first aspect, the processing apparatus is configured to: detect corruption of the writable partition; and reformat the writable partition responsive to the detection of corruption.

In a second aspect, the subject matter described in this specification can be embodied in methods that include verifying a digital signature of a header for an application image, wherein the header includes a hash of the application image; generating an encryption key based on the hash; encrypting, using the encryption key, data to be written to a writable partition that is mounted with a filesystem of the application image; and decrypting, using the encryption key, data read from the writable partition.

In the second aspect, the header may include a version string for the application image and the encryption key may be generated based on the version string for the application image. In the second aspect, generating the encryption key may include inputting a context string that includes the hash to a trusted operating system device that is configured to apply a key generation algorithm to determine the encryption key based on the context string and a fuse key of the trusted operating system device. For example, the context string may include at least one of an overlay name, a slot number, or a lock state for the writable partition. For example, the key generation algorithm may be compliant with an NIST800-108 standard. In the second aspect, the hash may be a root hash of a hash tree. In the second aspect, the writable partition may be an overlay mount of the filesystem of the application image. In the second aspect, the application image may include a root file system. In the second aspect, the methods may include detecting corruption of the writable partition; and reformatting the writable partition responsive to the detection of corruption.

In a third aspect, the subject matter described in this specification can be embodied in a non-transitory computer-readable storage medium that includes instructions that, when executed by a processor, facilitate performance of operations comprising: verifying a digital signature of a header for an application image, wherein the header includes a hash of the application image; generating an encryption key based on the hash; encrypting, using the encryption key, data to be written to a writable partition that is mounted with a filesystem of the application image; and decrypting, using the encryption key, data read from the writable partition.

In the third aspect, the header may include a version string for the application image and the encryption key may be generated based on the version string for the application image. In the third aspect, generating the encryption key may include inputting a context string that includes the hash to a trusted operating system device that is configured to apply a key generation algorithm to determine the encryption key based on the context string and a fuse key of the trusted operating system device. For example, the context string may include at least one of an overlay name, a slot number, or a lock state for the writable partition. For example, the key generation algorithm may be compliant with an NIST800-108 standard. In the third aspect, the hash may be a root hash of a hash tree. In the third aspect, the writable partition may be an overlay mount of the filesystem of the application image. In the third aspect, the application image may include a root file system. In the third aspect, the operations may include detecting corruption of the writable partition; and reformatting the writable partition responsive to the detection of corruption.

In a fourth aspect, the subject matter described in this specification can be embodied in systems for secure data storage that include a data storage device comprising a read-only partition storing signature-verified software, and a writable partition configured to store cache data; a trusted execution environment configured to: store a device-specific secret key, generate an identifier string for a software version, and derive an encryption key based on the device-specific secret key and the identifier string; and a processor configured to: encrypt data to be written to the writable partition using the derived encryption key, integrate the writable partition with the read-only partition in a filesystem structure, detect corruption of the writable partition upon software version change, and reformat the writable partition upon detection of corruption.

In the fourth aspect, the signature-verified software may include a secure bootchain configured to verify digital signatures of successive boot stages before execution. In the fourth aspect, the writable partition may be mounted over the read-only partition using overlay mounting. In the fourth aspect, the trusted execution environment may include a hardware-isolated secure processing region. In the fourth aspect, the identifier string may include a random value uniquely associated with the software version. In the fourth aspect, deriving the encryption key may include applying a key derivation function to combine the device-specific secret key and the identifier string. In the fourth aspect, detecting corruption may include attempting to decrypt data using a new encryption key derived after the software version change.

In a fifth aspect, the subject matter described in this specification can be embodied in systems that include a processing apparatus that is configured to: verify a digital signature of a header for an application image, wherein the header includes a hash of the application image; generate an encryption key based on the hash; encrypt, using the encryption key, data to be written to a writable partition that is mounted with a filesystem of the application image; and decrypt, using the encryption key, data read from the writable partition.

In the fifth aspect, the header may include a version string for the application image and the encryption key may be generated based on the version string for the application image. In the fifth aspect, the processing apparatus is configured to input a context string that includes the hash to a trusted operating system device that is configured to apply a key generation algorithm to determine the encryption key based on the context string and a fuse key of the trusted operating system device. In the fifth aspect, the context string may include at least one of an overlay name, a slot number, or a lock state for the writable partition. For example, the key generation algorithm may be compliant with an NIST800-108 standard. In the fifth aspect, the hash may be a root hash of a hash tree. In the fifth aspect, the application image may include a root file system. In the fifth aspect, the writable partition may be an overlay mount of the filesystem of the application image. In the fifth aspect, the processing apparatus is configured to: detect corruption of the writable partition; and reformat the writable partition responsive to the detection of corruption. In the fifth aspect, the processing apparatus may be incorporate in a controller for an unmanned aerial vehicle. In the fifth aspect, the processing apparatus may be incorporate in an automated docking station for an unmanned aerial vehicle.

In a sixth aspect, the subject matter described in this specification can be embodied in unmanned aerial vehicles that include a processing apparatus communicatively coupled to a trusted execution environment and a secure data storage device, the processing apparatus configured to: verify a digital signature of a header for an application image using an asymmetric cryptographic method; generate a version-specific encryption key within the trusted execution environment using a key derivation function based on a hash of the application image and a device-specific fuse key; encrypt data stored in a writable overlay partition of a secure data storage device using AES-GCM encryption; and automatically invalidate stored encrypted data upon detection of a software version update, thereby preventing unauthorized rollback attacks.

In the sixth aspect, the processing apparatus may use a key derivation function compliant with the NIST SP 800-108 standard to generate the encryption key. In the sixth aspect, the encryption key may be derived within a trusted execution environment using a device-specific fuse key, preventing external extraction of encryption keys. In the sixth aspect, the processing apparatus may be configured to detect a software update and reformat the writable overlay partition upon detecting an encryption key mismatch. In the sixth aspect, the processing apparatus may be configured to encrypt mission log data stored in the writable overlay partition to prevent data exfiltration during unauthorized access.

In a seventh aspect, the subject matter described in this specification can be embodied in methods for securing stored data in an unmanned aerial vehicle that include: verifying a digital signature of a header for an application image using an asymmetric cryptographic algorithm; generating an encryption key using a key derivation function within a trusted execution environment; encrypting a writable overlay partition using AES-GCM encryption; detecting a software version update and, in response, reformatting the writable overlay partition to remove stale data; and applying an error detection mechanism to verify partition integrity before allowing decryption operations.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures.

What is claimed is:

1. An unmanned aerial vehicle comprising:

a processing apparatus configured to:

verify a digital signature of a header for an application image, wherein the header includes a hash of the application image;

generate an encryption key based on the hash; and decrypt, using the encryption key, data read from an overlay mount of a filesystem of the application image.

2. The unmanned aerial vehicle of claim 1, wherein the header includes a version string for the application image and the encryption key is generated based on the version string for the application image.

3. The unmanned aerial vehicle of claim 1, wherein the processing apparatus is configured to:

input a context string that includes the hash to a trusted operating system device that is configured to apply a key generation algorithm to determine the encryption key based on the context string and a fuse key of the trusted operating system device.

4. The unmanned aerial vehicle of claim 3, wherein the context string includes at least one of an overlay name, a slot number, or a lock state for the overlay mount.

5. The unmanned aerial vehicle of claim 1, wherein the hash is a root hash of a hash tree.

6. The unmanned aerial vehicle of claim 1, wherein the processing apparatus is configured to:

encrypt, using the encryption key, data to be written to the overlay mount.

7. The unmanned aerial vehicle of claim 1, wherein the processing apparatus is configured to:

detect corruption of the overlay mount; and reformat the overlay mount responsive to the detection of corruption.

8. A method comprising:

verifying a digital signature of a header for an application image, wherein the header includes a hash of the application image;

generating an encryption key based on the hash; and decrypting, using the encryption key, data read from a writable partition that is mounted with a filesystem of the application image.

9. The method of claim 8, wherein the header includes a version string for the application image and the encryption key is generated based on the version string for the application image.

10. The method of claim 8, wherein generating the encryption key comprises:

inputting a context string that includes the hash to a trusted operating system device that is configured to apply a key generation algorithm to determine the encryption key based on the context string and a fuse key of the trusted operating system device.

11. The method of claim 10, wherein the context string includes at least one of an overlay name, a slot number, or a lock state for the writable partition.

12. The method of claim 8, wherein the hash is a root hash of a hash tree.

13. The method of claim 8, wherein the writable partition is an overlay mount of the filesystem of the application image.

14. The method of claim 8, comprising:

encrypting, using the encryption key, data to be written to the writable partition.

15. The method of claim 8, comprising:

detecting corruption of the writable partition; and reformatting the writable partition responsive to the detection of corruption.

16. A system for secure data storage comprising:

a data storage device comprising a read-only partition storing signature-verified software, and a writable partition configured to store cache data;

a trusted execution environment configured to: store a device-specific secret key, generate an identifier string for a software version, and derive an encryption key based on the device-specific secret key and the identifier string; and a processor configured to: encrypt data written to the writable partition using the derived encryption key, integrate the writable partition with the read-only partition in a filesystem structure, detect corruption of the writable partition upon software version change, and reformat the writable partition responsive to the detection of corruption.

17. The system of claim 16, wherein the signature-verified software comprises a secure bootchain configured to verify digital signatures of successive boot stages before execution.

18. The system of claim 16, wherein the writable partition is mounted over the read-only partition using overlay mounting.

19. The system of claim 16, wherein the trusted execution environment comprises a hardware-isolated secure processing region.

20. The system of claim 16, wherein the identifier string comprises a random value uniquely associated with the software version.

* * * * *